United States Patent

Kooijmans et al.

[11] Patent Number: 4,816,300
[45] Date of Patent: Mar. 28, 1989

[54] PROCESS FOR THE PREPARATION OF CARBOXYLATED AMIDE BINDERS

[75] Inventors: Petrus G. Kooijmans; Roeland Van Iperen; Arjan Sikking, all of Amsterdam, Netherlands

[73] Assignee: Shell Oil Company, Houston, Tex.

[21] Appl. No.: 144,288

[22] Filed: Jan. 15, 1988

[30] Foreign Application Priority Data

Jan. 16, 1987 [GB] United Kingdom ............... 8701057

[51] Int. Cl.⁴ ................. C08G 59/14; C09D 3/58
[52] U.S. Cl. ................. 427/386; 523/414; 523/416; 523/404; 525/504; 525/533; 528/103; 528/110; 528/341; 528/363
[58] Field of Search ............ 427/386; 523/414, 404, 523/416; 525/504, 533; 528/110, 103, 341, 363

[56] References Cited

U.S. PATENT DOCUMENTS

| | | | |
|---|---|---|---|
| 4,139,510 | 2/1979 | Anderson | 525/533 X |
| 4,174,333 | 11/1979 | Hartman et al. | 523/414 |
| 4,362,847 | 12/1982 | Kooijmans et al. | 523/414 X |
| 4,405,662 | 9/1983 | Raudenbusch et al. | 528/110 X |
| 4,471,025 | 9/1984 | Bernelin et al. | 525/533 X |
| 4,489,182 | 12/1984 | Valko | 523/414 X |
| 4,547,409 | 10/1985 | Geist et al. | 528/110 X |
| 4,568,709 | 2/1986 | Paar et al. | 523/414 |
| 4,686,249 | 8/1987 | Diefenbach et al. | 523/414 X |

FOREIGN PATENT DOCUMENTS 62-141077 6/1987 Japan .

Primary Examiner—Earl Nielsen

[57] ABSTRACT

The invention provides a process for the preparation of water-reducible carboxylated amide binders comprising the steps of:

(1) reacting:

(a) a substantially epoxy-free compound of general formula

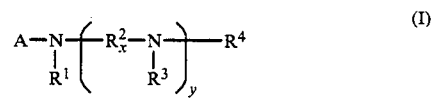

wherein A is the organic residue of a ring opening reaction of a vicinal epoxy group of a polyepoxide with ammonia or amine having at least two amino hydrogens, $R^1$, $R^3$ and $R^4$ each is hydrogen or a $C_{1-6}$ alkyl group, with the proviso that at least one of $R^1$, $R^3$ and $R^4$ is hydrogen, $R^2$ is a $C_{2-12}$ alkylene group, x is 0 or 1 and y is a number from 0 to 4, with (b) a carboxyl group-containing mono- or polyester compound derived from a di- or polycarboxylic acid and a polyhydric alcohol having at least one glycol group per molecule, with the proviso that only one carboxyl group per molecule or di- or polycarboxylic acid has been esterified and the or each ester group is a β-hydroxyester group, at a temperature in the range of from 80° to 160° C., and (2) neutralizing the carboxylic groups or the residual amine groups in the product of step (1).

17 Claims, No Drawings

PROCESS FOR THE PREPARATION OF CARBOXYLATED AMIDE BINDERS

BACKGROUND OF THE INVENTION

This invention relates to a process for the preparation of hydrolytically stable binders, in a specific aspect to the preparation of hydrolytically stable carboxylated amide binders wherein the carboxyl groups are linked to the binder via an amide group, to coating compositions containing said hydrolytically stable binders, and to their application by electrodeposition or by conventional application techniques.

Although the use of water-soluble or water-reducible binders is increasing, one of the problems frequently encountered with aqueous coating compositions based on such binders is insufficient hydrolytic stability. This phenomenon is particularly observed with anionic water-reducible binders, i.e., those binders which derive their ultimate water-reducibility from the presence of a sufficient number of built-in carboxyl groups. The insufficient hydrolytic stability of anionic binders in aqueous media is generally related to the presence of hydrolytically unstable ester linkages, which are frequently introduced simultaneously with the introduction of the carboxyl groups.

One of many methods proposed to prepare ester linkage-free anionic binders has been described in British Patent Application GB No. 2,037,291A. In this method, an essentially epoxy-free, amino group-containing binder is reacted with a cyclic anhydride of a dibasic carboxylic acid to provide after a ring opening reaction a carboxylated amide binder, which upon neutralization with a suitable base becomes water-reducible.

Although the described method claims the synthesis of a new class of ester linkage-free water-reducible binders, there are problems associated with the method. One problem related to the use of cyclic anhydrides is the poor solubility of these generally solid materials in the reaction medium. Furthermore such anhydrides may contain, depending on the degree of purity, a certain amount of free acid. Both unreacted anhydride and free acid are very difficult if not impossible to remove from the rather viscous reaction medium. When such anhydrides are employed in the preparation of waterborne binders, the presence of unconverted anhydride or free acid in the ultimate coating composition can have a negative effect on the electrodeposition characteristics.

It is therefore an object of the present invention to develop a method for the preparation of carboxylated amide binders which does not involve the use of a cyclic anhydride.

SUMMARY OF THE INVENTION

According to the invention, a process for the preparation of water-reducible carboxylated amide binders comprises the steps of:
(1) reacting:
   (a) a substantially epoxy-free compound of general formula

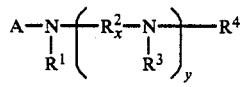
(I)

wherein A is the organic residue of a ring opening reaction of a vicinal epoxy group of a polyepoxide with ammonia or amine having at least two amino hydrogens per molecule, $R^1$, $R^3$ and $R^4$ are selected individually from hydrogen and a $C_{1-6}$ alkyl group with the proviso that at least one of $R^1$, $R^3$ and $R^4$ is hydrogen; $R^2$ is a $C_{2-12}$ alkylene group; x is 0 or 1; and y is 0 to 4, with (b) a carboxyl group-containing mono- or polyester compound derived from a di- or polycarboxylic acid, which carboxylic acid has the ability to form a cyclic monoanhydride, and a polyhydric alcohol having at least one glycol group per molecule, with the proviso that only one carboxyl group per molecule of the di- or polycarboxylic acid has been esterified and each ester group is a β-hydroxyester group, at a temperature in the range of from 80 to 160° C., and (2) subsequently neutralizing, in the product as prepared under (1):
   (a) the carboxyl groups with a basic compound, or
   (b) the residual amino groups with an acid.

DETAILED DESCRIPTION OF THE INVENTION

The epoxy compounds which may be employed in the preparation of the essentially epoxy-free amino group-containing compounds are polyepoxides which do not contain hydrolyzable groups, e.g., epoxy compounds which do not contain ester linkages. Examples of such epoxy compounds include reaction products of epihalohydrins and polyhydric phenols. Said polyhydric phenols include both polyhydric mononuclear phenols such as catechol, resorcinol, hydroquinone, pyrogallol and the like, as well as polyhydric polynuclear phenols such as 1,1-bis(4-hydroxyphenyl)methane, 1,1-bis(4-hydroxyphenyl)ethane, 2,2-bis(4-hydroxyphenyl)-propane and their isomers, as well as novolac resins of general formula

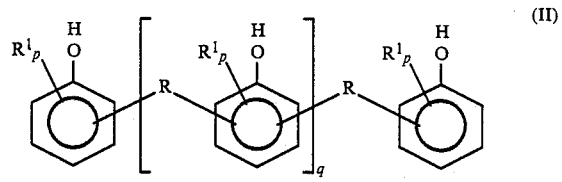
(II)

wherein R represents an alkylene, e.g., $CH_2$ group, $R^1$ represents an alkyl group, e.g. a methyl, p-t-butyl, octyl or nonyl group, q and p are numbers having average values $0 < q < 6$ and $0 < p < 2$, or of general formula

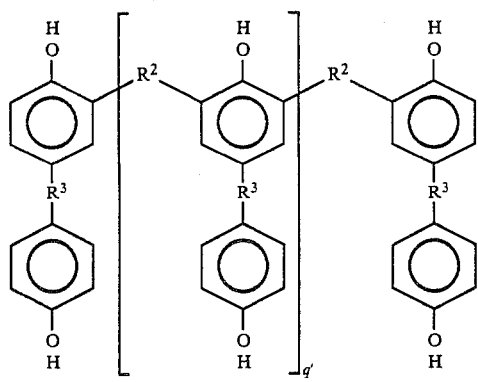

(III)

wherein $R^2$ represents an alkylene, e.g. $CH_2$ group, $R^3$ represents an alkylene, e.g. $CH_2$ or $C(CH_3)_2$ group, a carbonyl group, an oxygen or sulphur atom and $q'$ is a number having an average value in the range of from 0 to 2.

Another example of a suitable polyhydric polynuclear phenol is 1,1,2,2-tetra(4-hydroxyphenyl)ethane. Polyglycidyl ethers derived from polyhydric phenols of formulae II and III are known and are described, together with processes for their preparation, in, for example, U.S. Pat. No. 2,844,533, Dutch Patent Application No. 8100830, W. German Patent Application No. 2,656,867 and British Patent Application No. 2,001,991. Other suitable epoxy compounds include mono- and polyglycidyl ethers of, respectively, mono- and polyhydric alcohols. A class of polyglycidyl ethers which is preferred when the ultimate carboxylated amide group-containing binder prepared according to the process of the present invention is used in can coating compositions are polyglycidyl ethers having an average of n epoxy groups per molecule, where $1<n<2$, which comprise the reaction product of a multifunctional polyglycidyl ether having an average x epoxy groups per molecule, where $x>2$, with $(x-n)$ mol of a monofunctional phenol per mol of the multi-functional polyglycidyl ether and which polyglycidyl ethers have been described in European Patent Application No. 0127915. These polyglycidyl ethers may be used in combination with "conventional" diglycidyl ethers. Diglycidyl ethers of 2,2-bis(4-hydroxyphenyl)propane having an epoxy group concentration (EGC) in the range of from 1000 to 5500 mmol/kg are preferred diglycidyl ethers. Epoxy compounds such as those described hereinbefore can be converted into essentially epoxy-free compounds of general formula I via a ring opening reaction with ammonia or an amine having at least two amino hydrogens per molecule. Examples of suitable amines include primary mono-amines such as n-propylamine, isopropylamine, n-butylamine, isobutylamine, sec-butylamine as well as primary amines having alkyl chains with more than 4 carbon atoms. Another class of suitable amines are polyamines such as ethylenediamine, 1,3-propylenediamine, 1,4-butylenediamine, 1,6-hexylenediamine, 1,4-diaminocyclohexane, methylaminopropylamine and hydrazine. When the compound of general formula I results from a ring opening reaction with ammonia, $R^1$ and $R^4$ are hydrogen and y is 0; when a primary monoamine is used $R^1$ or $R^4$ is an alkyl group and y is 0; when hydrazine is used for the ring opening reaction $R^1$, $R^3$ and $R^4$ are hydrogen, x is 0 and y is 1; and when a polyamine is used for the ring opening reaction $R^3$ is hydrogen, x is 1 and y is 1 to 4.

The reactive amino hydrogen-containing compounds selected will depend upon the ultimate application of the carboxylated amide binder. If the ultimate field of application is coatings for food and beverage cans, for example, ammonia and amino group-containing compounds which have been approved by appropriate regulatory agencies will be preferably used. A further criterion for selecting a suitable amino compound is the functionality of the epoxy compound, in view of the risk of gelation when the functionalities of both epoxy and amino compound are high.

Methods for the preparation of the essentially epoxy-free amino group-containing compounds such as of general formula I are known and have been described e.g. in British Patent Specification No. 1221906, U.S. Pat. No. 4,176,221 and European Patent Application 0017894.

Di- or polycarboxylic acids on which the carboxyl group-containing mono- or polyester compounds may be based include dicarboxylic acids such as maleic acid, succinic acid, chlorosuccinic acid, nonenylsuccinic acid, dodecenylsuccinic acid, glutaric acid, o-phthalic acid, 1,2-cyclo-hexenedicarboxylic acid and 1,2-cyclohexanedicarboxylic acid, and tricarboxylic acids such as trimellitic acid.

Polyhydric alcohols containing at least one glycol group include ethylene glycol, propylene glycol, 2,3-butanediol, glycerol, xylitrol, D-sorbitol, L-sorbitol and hydrolyzed mono- and polyepoxy compounds. Preferably the polyhydric alcohols have glycol groups comprising a primary and a secondary hydroxyl group.

Preferably the carboxyl group-containing mono- or polyester compound is a mono-β-hydroxy ester compound. A mono-β-hydroxy ester compound based on trimellitic acid and propylene glycol is especially preferred.

The carboxyl group-containing mono- or polyester compounds may be obtained in high yield and selectively by reacting at least one mol of the cyclic anhydride of a di- or polycarboxylic acid and one mol of a polyhydric alcohol as described hereinbefore, at a temperature of up to approximately 150° C.

The preparation of the carboxylated amide binder may conveniently be effected by heating the amino group-containing compound, e.g., as a solution in a solvent, preferably a water-miscible solvent such as 2-n-butoxyethanol, together with the carboxyl group-containing compound described hereinbefore in the required ratio and at a temperature in the range of from 80 to 160° C., preferably from 100 to 120° C. The time required to complete the conversion of amino groups into carboxylated amide binders (hereinafter referred to as amidation) will depend both on the reaction temperature and the degree of amidation. The degree of reaction can be established by determination of the residual amino group concentration. When only a relatively low percentage of the amino groups are to be converted, the ultimate binder will be a carboxyl group-containing cationic binder, which will require neutralization with an acid, such as lactic acid for example, to become water-reducible. An anionic binder may be obtained if a larger percentage of the amino groups are converted. Such a binder will require neutralization with a basic compound to become water-reducible. With the latter mode of binder preparation it may be beneficial to select a carboxyl group-containing ester compound derived from an alcohol which is at least partly water-miscible.

The process of the present invention also affords the possibility of preparing carboxylated amide binders wherein both a sufficient number of amino groups are present to make the binder water-reducible after neutralization with an acid, as well as sufficient carboxyl groups to impart water-reducibility after neutralization with a base, i.e., "amphoteric" binders.

The carboxylated amide binders may be employed to prepare water-reducible coating compositions and aqueous coatings based thereon. To this end the binders may be blended with a crosslinking agent before or after neutralization. The crosslinking agents which may be employed in the preparation include water-thinnable, as well as solvent borne and non-water thinnable crosslinking agents such as melamine-, urea- and phenolformaldehyde resins. Said crosslinking agents are preferebly used in a ratio of carboxylated amine binder to crosslinking agent in the range of from 95:5 to 60:40 w/w. Pigments, fillers, dispersing agents, and other components known in the art of paint formulation may further be added. Addition of small amounts (up to 1% w) of non-ionic surfactant may be useful for further stabilization of aqueous compositions or improvement of the wetting during application. Co-solvents, such as 2-n-butoxyethanol and, especially, 2-n-hexyloxyethanol, may advantageously be included. The water for use in the aqueous compositions is preferably purified, such as by distillation or demineralization. The water-dilutable compositions may be applied by a variety of methods known in the art such as spraying, dipping and electrodeposition, onto a variety of substrates, in particular metals such as bare steel, phosphated steel, chromate-treated steel, zinc, tin plate (for can coating), and aluminum (also e.g. for can coating), to produce cured coatings of desirable thickness from 2 micrometers upwards up to in general 40 micrometers.

Curing of the coating compositions made according to the process of the present invention can be performed by stoving, for example, at temperatures of from 170 to 220° C., with curing times varying from 3 to 20 minutes.

The invention will be further understood from the following examples, in which parts and percentages are by weight, unless otherwise indicated, and for which the following information is provided.

Preparation of Amino Group-Containing Compound A 272 g of a 25% w aqueous ammonia solution and 600 g of tetrahydrofuran (THF) were added to and blended with 3103 g of a 60% w solution of EPIKOTE 1007 (trademark) (epoxy group concentration (EGC) 537 mmol/kg) in 2-n-butoxyethanol to arrive at a clear "solution". Thereupon the temperature of the reactor contents was gradually raised to about 60° C. in approximately 6 hours during which period virtually all the epoxy groups had reacted. Subsequently the temperature in the reactor was increased to 120° C., in as short a time as possible, and maintained at that temperature to remove excess ammonia, water and THF by distillation using a nitrogen purge. The ammonia removal was checked with the aid of wet paper-pH-indicator. The reaction produce was found to contain 0.39 meq/g solids of total amino nitrogen
0.27 meq/g solids of primary amino groups
0.10 meq/g solids of secondary amino groups
0.02 meq/g solids of tertiary amino groups Preparation of Amino Group-Containing Compound B (1) Polyglycidyl ether preparation 615 g of a multifunctional epoxy diphenylolpropane novolac resin, having an average molecular weight 615 and on average 3.1 epoxy groups per molecule was heated with 352 g nonylphenol under stirring to 140° C., whereupon 0.48 g of a 50% w aqueous tetramethylammonium chloride solution was added. The reactor contents were maintained at 140° C. until the reaction had been completed, i.e., the calculated EGC (1550 mmol/kg) had been obtained. After slight cooling 2-n-butoxyethanol was added to arrive at a solution containing 66.7% w solids.

(2) Preparation of Amino Groups-Containing Compound 1450.5 g of the polyglycidyl ether solution prepared under 1), 708 g of EPIKOTE 1001 (trademark) (EGC 2119 mmol/kg) and 634.5 g 2-n-butoxyethanol were homogenized by heating to 90° C. with stirring. After cooling to 25° C. 408 g of a 25% w aqueous ammonia solution and 772.5 g of a 4/1 w/w THF/ethanol blend were blended in to arrive at a clear "solution". From this point, the same procedure was followed as with the preparation of amino group-containing compound A. The reaction product was found to contain 0.98 meq/g solids of total amino nitrogen
0.82 meq/g solids of primary +secondary amino groups
0.16 meq/g solids of tertiary amino groups Preparation of 2-hydroxypropyl dihydrogen trimellitate (β-hydroxyester)

192 g of TMA and 76 g of propylene glycol were heated to 140° C. in approximately 40 minutes under continuous stirring, and maintained at said temperature for 15 minutes in which period all the anhydride had reacted. Final acid content 7.4 mol/kg.

EXAMPLES I-V

Preparation of carboxylated amide binders and of the corresponding aqueous solutions (a) Binder preparation Amino group-containing compound A or B (60% w in 2-n-butoxyethanol) and 2-hydroxypropyl dihydrogen trimellitate were heated to 120° C. in amounts as indicated hereinafter and maintained at this temperature for the period of time indicated in Table 1, which also gives the amounts of the individual reagents and additional process data and product characteristics.

(b) Aqueous solution preparation

The carboxylated amide binders were further tested for their water reducibility characteristics. To this end the cationic binder system was partially neutralized with an acid and the anionic binder systems were partially neutralized with a base. The neutralization was effected by mixing the neutralizing agent at approximately 20° C. with the relevant binder solution. Subsequently the neutralized binder solutions were gradually diluted with water under vigorous stirring to arive at the required solids content. Details are given in Table 1 together with some characteristics of the aqueous systems.

TABLE 1

| Example | I | II | III | IV | V |
|---|---|---|---|---|---|
| Amino group-containing compound | A | B | B | B | B |
| Amino group-containing compound, g solution | 3113 | 277.2 | 231 | 277 | 222 |
| -hydroxy ester, g | 112.5 | 3.74 | 10.8 | 16.2 | 16.2 |
| Heating time to 120° C., min. | 20 | 20 | 20 | 20 | 20 |
| Heating at 120° C., hr | 5 | 1 | 2.5 | 5 | 14 |
| Total amino nitrogen, mol/kg | 0.16 | 0.87 | 0.65 | 0.57 | 0.48 |
| Acid content, mol/kg* | 0.43 | 0.15 | 0.54 | 0.68 | 0.75 |
| Solids content, % w | 61.4 | 61 | 62 | 62.4 | 62.9 |
| Neutralizing agent | $NH_3$ | Lactic Acid | | DMAMP** | |
| Degree of neutralization | 0.8 | 0.7 | 0.55 | 0.5 | 0.35 |
| Solids content aqueous "solution", % w | 34 | 15 | 15 | 15 | 15 |
| pH | 8.0 | 4.7 | 9.3 | 8.8 | 8.1 |
| Conductivity, S/cm | — | 600 | 1120 | 1030 | 900 |
| Binder type | anionic | cationic | anionic | anionic | anionic |

*Determined by treating the binder with a known excess of aqueous KOH, followed by titration of the excess KOH with HCl.
**2-dimethylamino-2-methyl-1-propanol.

EXAMPLE VI

Anionic coating compositions and coatings prepared therewith

The aqueous anionic binder composition as prepared in Example I was used to prepare a number of aqueous coating compositions in combination with different amounts of, respectively, an approximately 100% w non-volatile liquid hexamethoxymethylmelamine crosslinking agent Cymel 301 trademark) and an approximately 100% non-volatile phenolic resin Phenodur PR 217 (trademark). The coating compositions were prepared by mixing the aqueous binder composition and the relevant crosslinking agent in the ratio indicated in Table 2.

The thus-obtained coating compositions were applied by bar coater in a 5 micron dry film thickness onto 0.5 mm tin plate ($E_2$ quality) and stored according to the schedule indicated in Table 2, which also shows film performance properties. For the latter, the following information is provided: MEK res. =solvent resistance expressed as the number of double rubs with a methylethylketone-moistened cloth necessary to remove the coating. The sterilization resistance of the coatings was determined by exposure to water or lactic acid at 121° C. for 90 minutes and rated according to a numberical scale ranging from 5: no blushing to 0: very heavy blushing.

EXAMPLE VII

Cationic Coating Compositions and Coatings Prepared Therewith 36 g of the carboxylated amide binder solution (61 % w in 2-n-butoxyethanol) as prepared in Example II was blended consecutively with 7.3 g of Cymel 1156 (trademark), being an approximately 100% non-volatile highly viscous hexabutoxymethylmelamine resin, 2.2 g 2-hexyloxyethanol and 1.35 g of lactic acid (90 % w in water). Subsequently the homogeneous blend was gradually diluted with 148 g demineralized water under stirring. The thus obtained coating composition was filtered (through an E-D-schnellsieb 80 my filter) before use and was found to have the following characteristics:

| | |
|---|---|
| Solids content % w | 15 |
| Binder/crosslinking agent ratio | 75/25 |
| Acid value (on solids), mgKOH/g | 6 |
| Degree of neutralization | 0.7 |
| pH | 4.8 |
| conductivity, μs/cm | 560 |

This coating composition was used to coat 330 ml tinplate cans (2-piece DWI cans) and 0.5 mm tin-plate panels ($E_2$ quality) by cathodic electrodeposition. The can or the panel formed the cathode of an electrodeposition cell, the anode being a stainless steel member inserted within the can at a substantially uniform separation of 2 millimeters from the can, or in case of the panel

TABLE 2

| Aqueous binder ex example 1, g | 100 | 100 | 100 | 100 | 100 |
|---|---|---|---|---|---|
| Cymel 301, g | 1.8 | 3.8 | 8.5 | — | — |
| Phenodur PR 217, g | — | — | — | 14.6 | 22.6 |
| Binder/crosslinking agent ratio | 95/5 | 90/10 | 80/20 | 70/30 | 60/40 |
| Stoving schedule | 5'/200° C. | 5'/175° C. | 5'/175° C. | 5'/175° C. | 5'/150° C. | 10'/200° C. | 10'/200° C. |
| MEK resistance | >50 | 40 | >50 | >50 | >50 | 50 | >50 |
| Wedge bend flexibility, % failure | 10 | 10 | 20 | 30–40 | 15 | 25 | 35 |
| Sterilization res. | | | | | | | |
| Water | 5 | 5 | 5 | 5 | 5 | 5 | 5 |
| 0.5% w Lactic acid | 4–5 | 4–5 | 4–5 | 4–5 | 4 | 5 | 5 |
| 1% w Lactic acid | — | — | — | — | — | 4 | 5 |
| 2% w Lactic acid | — | — | — | — | — | 4 | 5 | a stainless steel panel was used as the anode and positioned at a distance of 2.5 cm from the tine-plate panel. The deposition conditions are given in Table 3 which also gives some performance properties of the coatings, which were obtained following the procedures described in Example VI.

TABLE 3

| Substrate | can | panel |
|---|---|---|
| Deposition voltage, V | 120 | 120 |
| Deposition time, s | 2.2 | 3.4 |
| Stoving schedule | 5'/200° C. | 5'/200° C. |
| Dry film thickness $\mu$ | 8 | 7 |
| MEK resistance | >100 | >100 |
| Wedge bend flexibility % failure | 60 | 65 |
| Sterilization resistance | | |
| Water | 5 | 5 |
| 0.5% w Lactic acid | 3 | 3 |

What is claimed is:

1. A process for the preparation of water-reducible carboxylated amide binders comprising the steps of
   (1) reacting:
   (a) a substantially epoxy-free compound of general formula

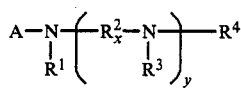

(I)

wherein A is the organic residue of a ring opening reaction of a vicinal epoxy group of a polyepoxide with ammonia or amine having at least two amino hydrogens per molecule; $R^1$, $R^3$ and $R^4$ are selected independently from hydrogen and $C_{1-6}$ alkyl groups, with the proviso that at least one of $R^1$, $R^3$ and $R^4$ is hydrogen; $R^2$ is a $C_{2-12}$ alkylene group; x is 0 or 1; and y is 0 to 4, with
   (b) a carboxyl group-containing mono- or polyester compound derived from a di- or polycarboxylic acid which has the ability to form a cyclic monoanhydride, and a polyhydric alcohol having at least one glycol group per molecule, with the proviso that only one carboxyl group per molecule of the di- or polycarboxylic acid has been esterified and each ester group is a $\beta$-hydroxyester group,
   at a temperature in the range of from 80° to 160° C., and (2) subsequently neutralizing, in the product as prepared under (1), any carboxyl groups and residual amino groups present.

2. A process according to claim 1 wherein $R^1$ and $R^4$ are hydrogen and y is 0.

3. A process according to claim 1 wherein $R^1$ is an alkylgroup, $R^4$ is hydrogen and y is 0.

4. A process according to claim 1 wherein $R^1$, $R^3$ and $R^4$ are hydrogen, x is 0 and y is 1.

5. A process according to claim 1 wherein $R^3$ is hydrogen, x is 1 and y is 1 to 4.

6. A process according to claim 1 wherein A is derived from a polyglycidyl ether of a polyhydric phenol.

7. A process according to claim 1 wherein A is derived from a polyglycidyl ether having on average n epoxy groups per molecule, where $1 < n \leq 2$, which comprises the reaction product of a multifunctional polyglycidyl ether having on average x epoxy groups per molecule, where $x > 2$, with $(x-n)$ mol of a monofunctional phenol per mol of the multifunctional polyglycidyl ether.

8. A process according to claim 7 wherein the polyglycidyl ether had been blended with a diglycidyl ether.

9. A process according to claim 8 wherein the diglycidyl ether is a diglycidyl ether of 2,2-bis(4-hydroxyphenyl)propane having an EGC in the range of from 1000 to 5500 mmol/kg.

10. A process according to claim 1 wherein the glycol group of the polyhydric alcohol is a glycol group comprising a primary and a secondary hydroxyl group.

11. A process according to claim 1 wherein the carboxyl group-containing ester compound is a mono $\beta$-hydroxy ester compound.

12. A process according to claim 11 wherein the mono $\beta$-hydroxy ester is based on trimellitic acid and propylene glycol.

13. A process according to claim 1 wherein the reaction is carried out at a temperature in the range of from 100° to 120° C.

14. A coating composition comprising
    (a) from about 60 to about 95 weight percent of the carboxylated amide binder of claim 1 and
    (b) from about 40 to about 5 weight percent of a crosslinking agent.

15. The coating composition of claim 14 in which the crosslinking agent is selected from the group of melamin-urea- and phenolformaldehyde resins.

16. The coating composition of claim 14 which further comprises water.

17. A process comprising applying the coating composition of claim 14 to a substrate and heating the applied composition under conditions effective for crosslinking the binder.

* * * * *